US005785862A

United States Patent [19]

Graham et al.

[11] Patent Number: 5,785,862
[45] Date of Patent: Jul. 28, 1998

[54] PREPARATION AND USES OF POLYFERRIC SULPHATE

[75] Inventors: Nigel Johnathan Douglas Graham, Surrey; Jiaqian Jiang, London, both of United Kingdom

[73] Assignee: Imperial College of Science Technology & Medicine, London, United Kingdom

[21] Appl. No.: 700,534

[22] PCT Filed: Mar. 6, 1995

[86] PCT No.: PCT/GB95/00483

§ 371 Date: Sep. 18, 1996

§ 102(e) Date: Sep. 18, 1996

[87] PCT Pub. No.: WO95/23765

PCT Pub. Date: Sep. 8, 1995

[30] Foreign Application Priority Data

Mar. 4, 1994 [GB] United Kingdom ............... 9404191

[51] Int. Cl.⁶ .................... C01G 49/14; C02F 1/52
[52] U.S. Cl. ................ 210/723; 423/558; 423/138
[58] Field of Search ................... 423/558, 146, 423/DIG. 2, 138; 210/723

[56] References Cited

U.S. PATENT DOCUMENTS 2,905,533  9/1959  Webb ............................ 23/126

FOREIGN PATENT DOCUMENTS

| 71741 | 8/1975 | Australia . | |
| 1518716 | 2/1968 | France . | |
| 4953195 | 5/1974 | Japan | 423/558 |
| 55104925 | 8/1980 | Japan | 423/558 |
| 61-215222 | 8/1986 | Japan | 423/558 |
| 2246561 | 2/1992 | United Kingdom | 423/558 |

*Primary Examiner*—Gary P. Straub
*Assistant Examiner*—Timothy C. Vanoy
*Attorney, Agent, or Firm*—Fay, Sharpe, Beall, Fagan, Minnich & Mc Kee

[57] ABSTRACT

A process for preparing a polymeric form of ferric sulphate wherein an acidic aqueous solution including ferrous sulphate is oxidized to form ferric sulphate in the solution in an oxidation stage at ambient pressure and in the absence of oxidation catalyst using at least one oxidizing agent. The ferric sulphate is subsequently at least partially hydrolyzed by addition to the solution of at least one base. The ferric sulphate is kept in contact with the base at the temperature selected for a time sufficient for polymerization of the at least partially hydrolyzed ferric sulphate. The polyferric sulphate (PFS) obtained by embodiments of such a process can be used as a coagulant or flocculant in water treatments for decolorizing, purifying or reducing pollutants with improved performance compared to conventional ferric sulphate and aluminium sulphate treatments.

20 Claims, No Drawings

PREPARATION AND USES OF POLYFERRIC SULPHATE

Chemical coagulants for drinking water, to purify and/or decolourise municipal water supplies for human consumption are known and include iron and aluminium-based inorganic coagulants.

Polyferric sulphate, PFS, is one known form of coagulant which has also been used to treat municipal and industrial waste waters to help remove, by flocculation, suspended organic waste matter. There is currently considerable interest in the more widespread application of PFS as coagulants. Because of its relative efficiency, PFS may need less chemical addition, it can have a greater removal capacity and may reduce the volumes of waste concentrates that require disposal or further treatments.

PFS is a known chemical and there are several patents describing methods for its preparation.

The present invention is concerned with methods for preparing polymeric forms of ferric sulphate, of which PFS is an example.

Essentially, the chemical can be prepared according to this invention by oxidising ferrous sulphate to ferric sulphate, and then carrying out a controlled, partial hydrolysis of the ferric sulphate to produce a heterogenous mixture of iron (III) hydrolysis species, $[Fe(OH)_x]^{(3-x)+}$, and polynuclear complexes of iron (III), $(Fe_m(OH)_x)_n^{(3m-x)n+}$. The functions of these species are to provide both colloid charge neutralization and polymer bridging between floc particles, leading in practice to a greater coagulating (and therefore, treatment) performance.

According to this invention there is provided a process for preparing a polymeric form of ferric sulphate wherein an acidic aqueous solution comprising ferrous sulphate is oxidised to form ferric sulphate in said solution in an oxidation stage at ambient pressure and in the absence of oxidation catalyst preferably using at least one oxidising agent from the following: ozone, nitric acid, peroxide, perchlorate and persulphate, said ferric sulphate subsequently being at least partially hydrolysed by addition to said solution of at least one base, the ferric sulphate being kept in contact with said base at the temperature selected for a time sufficient for polymerisation of the at least partially hydrolysed ferric sulphate.

The ferrous sulphate solution may be rendered acidic by addition of e.g. sulphuric acid. This may usefully increase the level of sulphate ions in solution, without adding unwanted ionic species. The pH of the starting solution is preferably less than 2.0, more preferably in the range 0.8 to 1.5.

Preferably the oxidation stage is a one-step oxidation stage. Preferred oxidising agents include peroxide and nitric acid. It is possible to use strong concentrated or even fuming nitric acid.

Accordingly the concentration of the nitric acid used in the oxidation stage is preferably at least 50% by volume, more preferably at least 70% by volume although nitric acid as concentrated as 90% by volume can be used.

It is also preferred to use peroxide as an oxidising agent and more preferably hydrogen peroxide. The strength of the hydrogen peroxide used, as with the option of nitric acid mentioned above, may be dictated by the economics of the cost of raw materials, oxidation temperature and oxidation time.

Thus a stronger oxidising agent will most likely allow a shorter oxidation time and/or a lower oxidation reaction temperature. With hydrogen peroxide at very strong concentration, perhaps of the order 30 volumes, it may even be possible to effect the oxidation stage at ambient temperatures, for example at a temperature in the range of 15° to 25° C. Oxidation temperatures when using hydrogen peroxide may be 70° C. or lower, such as 60° C. or lower, preferably no higher than 50° C.

Oxidation temperatures when using nitric acid as the oxidising agent, may be 110° C. or lower, such as 90° C. or lower, preferably no higher than 70° C. (which temperature may be possible when using the very concentrated, fuming nitric acid having a strength of at least 90%).

The oxidation time for a preferred one-step oxidation stage may be up to 3 hours, for example up to 2 hours, more preferably 1.75 to 1 hours. The oxidation time, as with the oxidation temperature, may depend upon the nature and strength of the oxidising agent used and the molar ratio of oxidant:iron $[Fe^{2+}]$.

It is preferred to carry out the oxidation such that there is a near-complete oxidation of ferrous $[Fe^{2+}]$ ions to ferric $[Fe^{3+}]$ ions. In consequence it is preferable for the concentration of ferrous ions in the solution after the oxidation step to be less than 2.5% $(Fe^{2+}/Fe^{3+})$, more preferably less than 1.25% $(Fe^{2+}/Fe^{3+})$, most preferably less than 0.25% $(Fe^{2+}/Fe^{3+})$.

The molar ratio of oxidant:ferrous ions in the solution, for the oxidation stage may depend upon economics and the desire to bring about the aforementioned near-complete oxidation of ferrous ions in aqueous solution, to ferric ions in the same solution. The molar ratio may also be influenced by the choice of oxidising agent and its relative strength, the oxidation temperature required or otherwise selected and the oxidation time necessary for this near-complete oxidation.

For example, when using nitric acid as the oxidising agent at say 90° C., at a concentration of 70%, the preferred molar ratio of oxidant:ferrous ions present in the aqueous solution is no higher than 2:1, more preferably no higher than 1.5:1, most preferably about 1.13:1.

When using hydrogen peroxide as the oxidising agent at say 50° C. at a strength of 30 vols, then the preferred molar ratio of oxidant:ferrous ions present in the aqueous solution is no higher than 3:1 preferably no higher than 2:1 most preferably about 1.81:1. These most preferred ratios have been found to achieve a near-complete oxidation of ferrous ions to ferric ions, i.e. <0.5 g $[Fe^{2+}]$ per liter after oxidation, when the oxidation has been allowed to proceed for about 1½ hours.

We have also used this concentrated form of hydrogen peroxide (30 vols) in the oxidation stage, with a larger molar excess of oxidant:ferrous ions, at lower temperatures, even at ambient temperatures of about 20° C. For example a molar ratio of 2.9:1 oxidant:ferrous ions led to near-complete oxidation even in the absence of oxidation catalyst and at ambient (atmospheric) levels of pressure. Thus additional heat energy input for the oxidation may be avoided.

In the secondary stage of at least partial hydrolysis, it is possible simply to add one or more bases to the ferric sulphate which has been formed in aqueous solution. The base can be strong or weak inorganic bases such as a hydroxide or bicarbonate of an alkali metal. In particular sodium hydroxide or sodium bicarbonate can be used. The hydrolysis stage can be likened to an 'aging' step during which iron (III) hydrolysis species, $[Fe(OH)_x]^{(3-x)+}$ and polynuclear complexes of iron (III), $[Fe_m(OH)_x]_n^{(3m-x)n+}$ form as a polymeric form of ferric sulphate, often referred to in the technical field as polyferric sulphate (PFS).

The hydrolysis stage is most preferably carried out immediately after a one-step oxidation process, by simple addition of base to the ferric ions which have been formed in the acidic, aqueous solution. It has not been found necessary to remove or even otherwise purify the ferric sulphate formed after the oxidation stage.

The amount of base added is preferably such as to provide an $[OH]^-:[Fe]^{3+}$ molar ratio in the finished product obtained by the process, the polymeric form of ferric sulphate, of at least 0.1, preferably at least 0.2, more preferably 0.25–0.45:1.0. We have found that an actual ratio of 0.3:1 of $[OH]^-:[Fe]^{3+}$ in the final product gives a desirable optimum in terms of performance, costs and stability.

The amount of iron in the final polymeric form of ferric sulphate produced by the method can be for example, up to 30 $g.l^{-1}$ of iron, preferably up to 40 $g.l^{-1}$ of iron, even more preferably up to 200 $g.l^{-1}$ of iron and most preferably upto 350 $g.l^{-1}$ of iron.

Elevated temperature may be necessary for the hydrolysis/polymerisation to proceed to a satisfactory $[OH]^-:[Fe]^{3+}$ ratio, for example a temperature of at least 30° C., preferably at least 40° C. more preferably 45° C. or higher, such as 50° C. Moreover the ferric sulphate can be kept in contact with the base for a time sufficient to obtain the aforementioned ratios of hydroxyl:ferric ions in the final polymeric product. Up to 3 hours may be needed at 50° C., preferably at least 2 hours.

The polyferric sulphate (PFS) obtained is usually in the form of a liquid solution which may not require separation or purification prior to use.

In use the polymeric form of ferric sulphate obtained, hereinafter also referred to for convenience as 'polyferric sulphate' and abbreviated as PFS can be used as a coagulant or flocculant to help purify and/or decolourise water for drinking water supplies and/or to reduce pollutants be they organic or inorganic, nitrogen- or phosphorus-containing such pollutants in municipal and/or industrial wastewaters.

The PFS obtained by processes according to the invention can be more economical in manufacture and/or confer better performance than PFS obtained by other commercially established procedures.

EXAMPLES 1 AND 2—PREPARATION

Example 1

The example described as follows is for the preparation of 500 mL solutions of PFS with a Fe(III) concentration of 40 g/L, using nitric acid as an oxidant.

| Prescription: | |
| --- | --- |
| 1. $FeSO_4.7H_2O$ (100%) | 100 g |
| 2. $H_2SO_4$ (98%) | 8.2 mL |
| 3. $HNO_3$ (70%) | 18.0 mL |
| 4. Water | 214.5 mL |
| 5. $NaHCO_3$ (0.5N) | 214.0 mL |

Preparation procedure:

The ferrous sulphate, sulphuric acid and the water in the prescribed amounts were added to a one liter reactor with a speed controlled mixer. The reaction temperature was controlled by an electromantle. Then, the temperature of the mixed solutions was raised to 60 (±0.2) °C. accompanied by vigorous stirring. Nitric acid was added to the mixed solutions gently. After the addition of the nitric acid, the reaction temperature was raised to and kept at 90 (±0.2) °C. with continuing vigorous stirring, until more than 99% of ferrous iron has been oxidized to ferric iron (after approximately 1.5 to 2.0 hours). The residual concentrations of ferrous iron were detected by the 1, 10-phenanthrene calorimetric method. The reaction temperature was then reduced to and kept at 50 (±0.2) °C. The sodium bicarbonate solution was added into the reaction solutions, and the addition rate was controlled to allow that all $NaHCO_3$ solution was added within a 30 minute period. Finally, the reaction solutions were maintained at a temperature of 50 (±0.2) °C. for another 1.5 hour period of aging. The PFS solution is thus prepared and, after cooling to room temperature is ready for use.

Properties of the prepared PFS:

[Fe(III)]=40 g/L, [Fe.(II)]≦0.2 g/L, OH/Fe (molar ratio) =0.3, pH=0.9–1.1, Average electrophoresis mobility=6±0.2 μm cm/V s, Size distribution of the molecular species in the PFS solution are:

low MW species (<0.5K)=20.0% (by weight of Fe), medium MW species (0.5–10K)=70.0% (by weight of Fe), large MW species (>10K)=10.0% (by weight of Fe).

Stability:

The PFS solutions prepared by this method are stable over at least a 6 month stored period.

Example 2

The example described as follows is for the preparation of 500 mL solutions of PFS with a Fe(III) concentration of 40 g/L, using hydrogen peroxide as an oxidant.

| Prescription: | |
| --- | --- |
| 1. $FeSO_4.7H_2O$ (100%) | 100 g |
| 2. $H_2SO_4$ (98%) | 8.2 mL |
| 3. $H_2O_2$ (30%) | 20.0 mL |
| 4. Water | 212.5 mL |
| 5. $NaHCO_3$ (0.5N) | 214.0 mL |

Preparation procedure:

The ferrous sulphate, sulphuric acid and the water in the prescribed amounts were added to the one liter reactor, and the reaction temperature was controlled by an electromantle. Both the reactor and the electromantle were the same as used in the Example 1. The temperature of the mixed solutions was then raised to 40 (±0.2) °C. accompanied by vigorous stirring. $H_2O_2$ was added to the reaction solutions gently. After the addition of the hydrogen peroxide, the reaction temperature was raised to and kept at 50 (±0.2) °C., and the oxidation process continued, until more than 99% of ferrous iron has been oxidized to ferric iron (after approximately 1.5 to 2.0 hours). The residual concentrations of ferrous iron were detected by the same method as described in the Example 1. The reaction temperature was kept at 50 (±0.2) °C. to carry out the aging process. The sodium bicarbonate solution was added into the reaction solutions, and the addition rate was controlled to allow that all $NaHCO_3$ solution was added within a 30 minute period. Finally, the reaction solutions were maintained at a temperature of 50 (±0.2) °C. for another 1.5 hour period of aging. The PFS solution is thus prepared and, after cooling to room temperature, is ready for use.

Properties of the prepared PFS:

[Fe(III)]=40 g/L, [Fe(II)]≦0.2 g/L, OH/Fe (molar ratio) =0.3, pH=1.0–1.1, Average electrophoresis mobility=6±0.2 μm cm/V s, Size distribution of the molecular species in the PFS solutions are:

low MW species (<0.5K=19.5% (by weight of Fe), medium MW species (0.5–10K)=69.0% (by weight of Fe), higher MW species (>10K)=11.5% (by weight of Fe).

Stability:

The PFS solutions prepared by this method are stable over at least a 6 month stored period.

Examples 3 to 8

PFS solutions prepared by the methods described in the Examples 1 and 2 have been used as a coagulant for the treatment of algal-laden and upland coloured surface waters in laboratory test and pilot-plant scale experiments. For the laboratory jar test experiments, a six-beaker jar test apparatus was used with each beaker containing either 300 mL of real or model algal waters, or 500 mL of simulated coloured waters. The fast mixing time was 3 min at a paddle speed of 300 rpm, the flocculation period was 25 min at a paddle speed of 35 rpm, and the sedimentation period was 1 hour. Supernatant samples after settling were withdrawn for analysis of algal cells, turbidity, UV absorbance, DOC, colour, residuals of Fe, Mn and Al. The coagulation pH required was achieved by prior addition of either HCl or NaOH, and the solution pH was checked during the mixing and flocculation periods. To evaluate the coagulation performance at lower water temperatures (4° C.), a special constant temperature bath was used with the jar test beakers. The low temperature of 4° C. (±0.2) was maintained throughout the whole coagulation process and the one hour settling period.

Pilot-plant experiments were undertaken which comprised the processes of pre-ozonation, coagulation, flocculation, dissolved-air flotation (DAF), sand filtration, intermediate ozonation and either GAC or BAC. In the test period of about four weeks, the pilot plant was operated under the conditions of with and without application of ozone, with coagulants of either PFS or ferric sulphate (FS) for three doses (1,3,5 mg/L as Fe), and at a constant pH of 7.5 Raw water flow rate was 2 m$^3$/hr. The pre-ozone dose and the contact time were 1.0 mg/L and 7.0 min, respectively; and the intermediate ozone dose was set to achieve a residual $O_3$ concentration of 0.25 mg/L after a contact time of 8.0 min. A separate set of samples was analysed to identify the kinds of algal species and to measure the total algal concentrations before and after treatment.

Table 1 presents example 3 using PFS and other comparative results (FS=ferric sulphate, AS=aluminium sulphate) for the treatment of two algal model waters in laboratory tests with the coagulants PFS, FS and AS at 18° C. and at pH 7.5, for a given dose of 0.2 mM as Fe or Al. It can be seen that the coagulation performance of PFS in removing algae, turbidity, DOC, etc. was clearly superior to the other two conventional coagulants.

Table 2 summarises results with PFS (Example 4), FS and AS (both comparative) for the treatment of coloured waters at 18° and 4° C. It can be seen from Table 2, that under the optimum coagulation conditions at 18° C., the removal efficiency achieved by the three coagulants was close. However, the required PFS dose was the lowest (0.107 mM as Fe), compared to FS (0.143 mM as Fe), and AS (0.185 mM as Al), to achieve similar removal percentages. In addition, as shown in Table 2, the coagulation performance of PFS did not appear to be influenced significantly by low water temperatures. For AS and FS, however, low water temperature appeared to have an adverse effect on the removals of UV-Abs and DOC; but the removals of colour were slightly reduced. Residual concentrations of FS and AS were slightly increased at low water temperatures.

Tables 3A and 3B show results from the pilot-plant experiments concerning the raw water qualities and removal efficiencies by DAF (Table 3 A) and by DAF and sand filters (Table 3B). PFS (Examples 5 to 8) displayed a much greater treatment performance in removing algae, turbidity, colour, TOC and UV-absorbance (254 nm). The removal percentages achieved by PFS at a dose of 3 mg/L were either similar or even superior to those achieved by FS at 5 mg/L, indicating that coagulant dosing costs may be reduced for the same treated water quality.

TABLE 1

Comparison of the treatment performance of PFS, FS and AS at 18° C. (Algal model waters)

| Coagulants | Total cell removal % | | DOC removal % | | Turbidity removal % | | UV-Abs (254 nm) removal % | | Vis-Abs (420 nm) removal % | | Colloid (floc) charge[a] | |
|---|---|---|---|---|---|---|---|---|---|---|---|---|
| | X* | Y† | X | Y | X | Y | X | Y | X | Y | X | Y |
| Example 3 PFS | 96 | 86 | 61 | 45 | 88 | 79 | 50 | 48 | 54 | 48 | 65 | 20 |
| FS | 80 | 61 | 33 | 24 | 69 | 60 | 40 | 36.5 | 45 | 36.5 | 28 | −8 |
| AS | 90 | 70 | 52 | 32 | 84 | 72 | 45 | 40 | 54 | 40 | 30 | 0 |

[a] The unit is (meq L$^{-1}$ 10$^{-4}$).

Coagulant dose for X and Y is 0.20 mM as Al$^{3+}$ or Fe$^{3+}$.

*X - The water quality characteristics of Asterionella model waters: Total cell conc. = 4.8 · 10$^4$ cells mL$^{-1}$, DOC = 2.5 ppm, UV-Abs(254 nm) = 9.6 m$^{-1}$, pH = 8.3, Turbidity = 4 NTU, Colloid charge = −92 meq L$^{-1}$ 10$^{-4}$.

†Y - The water quality characteristics of synthetic algal waters (Asterionella 'model' water + 2 mg/L humic substances): Total cell conc. = 5.0 · 10$^4$ cells mL$^{-1}$, DOC = 4.8 ppm, UV-Abs(254 nm) = 21.0 m$^{-1}$, pH = 7.92, Turbidity = 4.5 NTU, Colloid charge = −115 meq L$^{-1}$ 10$^{-4}$.

TABLE 2

Comparison of the treatment performance of PFS, FS and AS at 18° C. and 4° C. (Coloured waters).

| | Coagulant | Dose* (mM as Fe or Al) | pH* | Colour (420 nm) R % 18° C. | 4° C. | UV-Abs (254 nm) R % 18° C. | 4° C. | DOC R % 18° C. | 4° C. | Residual Fe (mg/L) 18° C. | 4° C. | Residual Al (mg/L) 18° C. | 4° C. |
|---|---|---|---|---|---|---|---|---|---|---|---|---|---|
| Example 4 | PFS | 0.107 | 4 | 92.0 | 91.3 | 83.2 | 82.2 | 80.3 | 78.8 | 0.09 | 0.098 | | |
| | FS | 0.143 | 4 | 91.1 | 89.5 | 84.8 | 80.5 | 80.2 | 76.7 | 0.165 | 0.180 | | |
| | AS | 0.185 | 5 | 92.0 | 91.4 | 82.5 | 75.7 | 75.4 | 68.2 | | | 0.064 | 0.074 |
| | Raw water | — | 8.1 | 5.82 m$^{-1}$ | | 38.8 m$^{-1}$ | | 8.2 mg/L | | 0.05 mg/L | | 0.14 mg/L | |

*The coagulation pH and coagulant dosages were selected in terms of the optimal pH and minimum dose required to achieve >90% colour removal, >80% UV removal and >75% DOC removal at 18° C.

TABLE 3A

Comparison of coagulation efficiency of PFS and FS in the pilot-plant experiments (by DAF.)

| | Running conditions | UV (254 nm) (m$^{-1}$) Raw water | * R % | TOC (mg/L) Raw water | R. % | Colour (400 nm) (m$^{-1}$) Raw water | R. % | Turbidity (NTU) Raw water | R. % |
|---|---|---|---|---|---|---|---|---|---|
| | FS, 3 mg/L, no O$_3$ | 11.0 | 13.64 | 6.17 | 10.8 | 12.0 | 36.67 | 2.5 | 48.0 |
| Example 5 | PFS, 3 mg/L, no O$_3$ | 11.5 | 26.10 | 6.38 | 21.0 | 13.3 | 51.43 | 2.6 | 67.5 |
| | FS, 5 mg/L, no O$_3$ | 12.0 | 20.83 | 6.18 | 17.40 | 11.4 | 40.0 | 2.6 | 41.6 |
| Example 6 | PFS, 5 mg/L, no O$_3$ | 12.5 | 28.0 | 5.54 | 22.6 | 12.54 | 48.68 | 2.5 | 62.5 |

*R. % = Percentage removal.

TABLE 3B

Comparison of coagulation efficiency of PFS and FS in the pilot-plant experiments. (by DAF and sand filters.)

| | Running conditions | UV (254 nm) (m$^{-1}$) Raw water | * R. % | TOC (mg/L) Raw water | R. % | Colour (400 nm) (m$^{-1}$) Raw water | R. % | Turbidity (NTU) Raw water | R. % | Algae (cells/mL) Raw water | R. % |
|---|---|---|---|---|---|---|---|---|---|---|---|
| | FS, 3 mg/L, no O$_3$ | 11.0 | 18.18 | 6.17 | 21.90 | 12.0 | 39.83 | 2.5 | 64.8 | 79300 | 89.86 |
| Example 7 | PFS, 3 mg/L, no O$_3$ | 11.5 | 30.43 | 6.38 | 24.76 | 13.3 | 53.23 | 2.6 | 73.0 | 249200 | 96.28 |
| | FS, 5 mg/L, no O$_3$ | 12.0 | 25.0 | 6.18 | 21.20 | 11.4 | 50.0 | 2.6 | 61.5 | 80000 | 54.57 |
| Example 8 | PFS, 5 mg/L, no O$_3$ | 12.5 | 36.0 | 5.54 | 26.68 | 12.54 | 55.82 | 2.5 | 69.2 | 208322 | 70.34 |

We claim:

1. A process for preparing a polymeric form of ferric sulphate, said process comprising the steps of: (i) oxidising an acidic aqueous solution comprising, ferrous sulphate to form ferric sulphate in said solution at atmospheric pressure and in the absence of an oxidation catalyst, said oxidation step using at least one oxidising agent, (ii) partially hydrolyzing the ferric sulphate solution obtained after said oxidation step by addition of at least one base, and (iii) aging the partially hydrolysed ferric sulphate solution obtained from said partial hydrolisis step at a temperature above 30° C. sufficient for polymerisation of the partially hydrolysed ferric sulphate to a polymeric form of ferric sulphate.

2. The process of claim 1 wherein greater than 99% of the ferrous ions in solution are oxidised to ferric ions prior to carrying out the partial hydrolysis step.

3. The process of claim 1 wherein the oxidation step is completed in a time less than or equal to 3 hours.

4. The process of claim 3 wherein the oxidation step is completed in a time less than or equal to 2 hours.

5. The process of claim 4 wherein said oxidation step is completed in a time less than or equal to 1.75 hours.

6. The process of claim 1 wherein the partial hydrolysis step is completed in a time less than or equal to 3 hours.

7. The process of claim 1 wherein the partial hydrolysis step is carried out at a temperature less than or equal to 50° C.

8. The process of claim 1 wherein the molar ratio of [OH]$^-$ to [Fe$^{3+}$] in the polymeric form of ferric sulphate is at least 0.1:1.0.

9. The process of claim 8 wherein the ratio is at least 0.2:1.0.

10. The process of claim 1 wherein the oxidising agent is selected from the group consisting of ozone, nitric acid, peroxide, perchlorate and persulphate.

11. The process of claim 10 wherein the oxidising agent further comprises hydrogen peroxide.

12. The process of claim 1 wherein the acidic aqueous solution present prior to carrying out the oxidation step further comprises sulphuric acid.

13. The process of claim 1 wherein the pH of the acidic aqueous solution present prior to carrying out the oxidation step is less than 2.0.

14. The process of claim 13 wherein the pH is from 0.8 to 1.5.

15. The process of claim 1 wherein the oxidation step is carried out at a temperature less than or equal to 110° C. when nitric acid is used as the oxidizing agent.

16. The process of claim 1 wherein the oxidation step is carried out at a temperature from 15° C. to 50° C.

17. The process of claim 1 wherein the base is selected from the group consisting of a hydroxide of an alkali metal and a bicarbonate of an alkali metal.

18. The process of claim 1 wherein iron (III) hydrolysis species $[Fe(OH)x]^{(3-x)+}$ and polynuclear complexes of iron (III) $[Fe_{(m)}(OH)_x]_n^{(3m-x)n+}$ form as the polymeric form of ferric sulphate during the partial hydrolysis step.

19. The process of claim 1 wherein the partial hydrolysis step is carried out immediately after the oxidation step without removal or purification of the ferric sulphate formed after the oxidation step.

20. A method of treating water, said method comprising the step of: adding a polymeric form of ferric sulphate to said water, said polymeric ferric sulphate produced from a process comprising the steps of (i) oxidising an acidic aqueous solution comprising ferrous sulphate to form ferric sulphate in said solution at atmospheric pressure and in the absence of an oxidation catalyst, said oxidation step using at least one oxidising agent, (ii) partially hydrolyzing the ferric sulphate solution obtained after said oxidation step by addition of at least one base, and (iii) aging the partially hydrolysed ferric sulphate solution obtained from said partial hydrolisis step at temperature above 30° C. sufficient for polymerisation of the partially hyrolysed ferric sulphate to a polymeric form of ferric sulphate.

* * * * *